(12) United States Patent
Steidl (10) Patent No.: US 12,403,743 B2
(45) Date of Patent: Sep. 2, 2025

(54) SUSPENSION ARRANGEMENT AND METHOD FOR CONTROLLING SUSPENSION ARRANGEMENTS

(71) Applicant: Hasse & Wrede GmbH, Berlin (DE)

(72) Inventor: Michael Steidl, Berlin (DE)

(*) Notice: Subject to any disclaimer, the term of this patent is extended or adjusted under 35 U.S.C. 154(b) by 0 days.

(21) Appl. No.: 18/688,028

(22) PCT Filed: Sep. 5, 2022

(86) PCT No.: PCT/EP2022/074602
§ 371 (c)(1),
(2) Date: Feb. 29, 2024

(87) PCT Pub. No.: WO2023/036733
PCT Pub. Date: Mar. 16, 2023

(65) Prior Publication Data
US 2025/0121643 A1    Apr. 17, 2025

(30) Foreign Application Priority Data
Sep. 9, 2021   (DE) ..................... 10 2021 123 385.2

(51) Int. Cl.
*B60G 17/02*    (2006.01)
*B60G 11/00*    (2006.01)
(Continued)

(52) U.S. Cl.
CPC ............. *B60G 17/02* (2013.01); *B60G 11/00* (2013.01); *B60G 11/27* (2013.01); *B60G 11/30* (2013.01);
(Continued)

(58) Field of Classification Search
CPC ........ B60G 2202/152; B60G 2202/154; B60G 2202/412; B60G 2202/413;
(Continued)

(56) References Cited

U.S. PATENT DOCUMENTS 3,966,223 A * 6/1976 Carr ..................... B60G 11/48
280/124.16
4,909,535 A * 3/1990 Clark ................... B60G 17/018
280/5.515
(Continued)

FOREIGN PATENT DOCUMENTS

DE    34 42 622 C2    5/1989
DE    103 27 485 A1   1/2005
(Continued)

OTHER PUBLICATIONS

English Translation Seidl, and original Document DE102008050682 (Year: 2008).*

(Continued)

*Primary Examiner* — Paul N Dickson
*Assistant Examiner* — Caitlin Anne Miller
(74) *Attorney, Agent, or Firm* — Crowell & Moring LLP (57) ABSTRACT

A suspension arrangement for a vehicle, in particular a utility vehicle having a base and a structure, is disclosed. This arrangement includes at least one first spring and at least one second spring, the at least one first spring and the at least one second spring having spring attachments which are connected to attachment apparatuses of the structure on one side and of the base on the other. The at least one second spring is fastened to the base by way of at least one adjustment device. An adjustable air spring suspension arrangement and methods for controlling the suspension arrangements are disclosed.

15 Claims, 8 Drawing Sheets

(51) Int. Cl.
　　*B60G 11/27* (2006.01)
　　*B60G 11/30* (2006.01)
　　*B60G 15/06* (2006.01)
　　*B60G 17/005* (2006.01)
　　*B60G 17/015* (2006.01)
　　*B60G 17/04* (2006.01)
　　*B60G 17/052* (2006.01)
　　*B60G 17/08* (2006.01)

(52) U.S. Cl.
　　CPC ......... *B60G 15/067* (2013.01); *B60G 17/005* (2013.01); *B60G 17/015* (2013.01); *B60G 17/0408* (2013.01); *B60G 17/0521* (2013.01); *B60G 17/08* (2013.01); *B60G 2202/152* (2013.01); *B60G 2202/154* (2013.01); *B60G 2202/412* (2013.01); *B60G 2202/413* (2013.01); *B60G 2202/42* (2013.01); *B60G 2204/62* (2013.01); *B60G 2206/42* (2013.01); *B60G 2500/102* (2013.01); *B60G 2500/20* (2013.01); *B60G 2500/201* (2013.01); *B60G 2500/30* (2013.01); *B60G 2800/162* (2013.01); *B60G 2800/912* (2013.01); *B60G 2800/916* (2013.01)

(58) Field of Classification Search
　　CPC ............ B60G 2202/42; B60G 2204/62; B60G 2206/42; B60G 2500/102; B60G 2500/20; B60G 2500/201; B60G 2500/30; B60G 2800/162; B60G 2800/912; B60G 2800/916; B60G 17/02; B60G 11/00; B60G 11/27; B60G 11/30; B60G 15/067; B60G 17/005; B60G 17/015; B60G 17/0408; B60G 17/0521; B60G 17/08
　　See application file for complete search history.

(56) References Cited

U.S. PATENT DOCUMENTS

| | | | | |
|---|---|---|---|---|
| 6,102,378 | A * | 8/2000 | Gieseler | F16F 9/05 |
| | | | | 267/190 |
| 7,748,263 | B2 * | 7/2010 | Pruckner | B60G 21/0558 |
| | | | | 73/117.03 |
| 8,313,108 | B2 * | 11/2012 | Ac | B60G 17/025 |
| | | | | 280/5.511 |
| 2005/0183627 | A1 | 8/2005 | Hommen et al. | |
| 2007/0132197 | A1 * | 6/2007 | Thies | B60G 17/0272 |
| | | | | 267/64.16 |
| 2007/0137913 | A1 * | 6/2007 | Wohanka | B60G 15/12 |
| | | | | 180/197 |
| 2009/0000368 | A1 * | 1/2009 | Pruckner | B60G 11/50 |
| | | | | 73/117.03 |
| 2012/0018962 | A1 | 1/2012 | Ac et al. | |

FOREIGN PATENT DOCUMENTS

| | | |
|---|---|---|
| DE | 103 30 198 A1 | 2/2005 |
| DE | 10 2004 013 559 A1 | 10/2005 |
| DE | 10 2005 059 116 A1 | 8/2007 |
| DE | 10 2006 011 856 A1 | 9/2007 |
| DE | 10 2008 050 682 A1 | 4/2010 |
| DE | 103 60 516 C5 | 12/2010 |
| DE | 10 2011 107 143 A1 | 1/2012 |
| EP | 1 577 125 B1 | 11/2011 |
| JP | 8-91033 A | 4/1996 |
| WO | WO 2006/107080 A1 | 10/2006 |

OTHER PUBLICATIONS

JH0891033A_English_Translation.pdf (Year: 1996).*
International Preliminary Report on Patentability (PCT/IB/326 & PCT/IB/373) issued in PCT Application No. PCT/EP2022/074602 dated Mar. 21, 2024, including English translation of Written Opinion (PCT/ISA/237) (13 pages).
International Search Report (PCT/ISA/210) issued in PCT Application No. PCT/EP2022/074602 dated Oct. 28, 2022 with English translation (6 pages).
German-language Written Opinion (PCT/ISA/237) issued in PCT Application No. PCT/EP2022/074602 dated Oct. 28, 2022 with partial English translation (20 pages).
German-language Office Action issued in German Application No. 10 2021 123 385.2 dated Apr. 13, 2022 (5 pages).

* cited by examiner

SUSPENSION ARRANGEMENT AND METHOD FOR CONTROLLING SUSPENSION ARRANGEMENTS

BACKGROUND AND SUMMARY

The invention relates to suspension arrangements for a vehicle. The invention also relates to a method for controlling such suspension arrangements.

Suspension arrangements, e.g. for damping a structure or chassis of a vehicle, in particular utility vehicle, are known in various designs.

For example, two or more springs with a different rigidity are used in parallel with one another in order to compensate for a load, e.g. of a utility vehicle.

For this purpose, for example, two helical screws of different lengths and with different rigidities are arranged coaxially in one another. The spring with the higher rigidity is shorter than the other. In the case of higher load weights, the longer spring with the lower rigidity is compressed until the shorter spring with the higher rigidity takes effect. A parallel arrangement of the springs is then present and the rigidities are added together.

Air springs are connected to a compressed air supply and can change their rigidity by varying the pressure of the compressed air. The resonant frequency can thus remain in a small range even if a load changes significantly (unloaded utility vehicle in contrast to a fully loaded one).

Document DE 34 42 622 C2 illustrates one example of an air spring apparatus.

The proposed solutions are actually tried and tested. There is, however, a constant demand for improved spring arrangements.

The object is therefore to provide an improved spring arrangement.

A further object lies in creating an improved method for controlling a spring arrangement.

According to the invention, a suspension arrangement for a vehicle, in particular a utility vehicle, having a base and a structure, has at least one first spring and at least one second spring, wherein the at least one first spring and the at least one second spring have spring fastenings which are connected to fastening devices on one hand of the structure and on the other hand of the base. The at least one second spring is attached to the base by means of at least one adjustment device.

The advantage thus arises that the second spring can be brought into contact with the structure to be damped by means of the adjustment device in different positions. As a result of the adjustment device, an advantageous adjustment to different load weights of a vehicle is possible.

The springs can be designed as desired, e.g. helical springs, air springs or the like.

A further suspension arrangement according to the invention for a vehicle, in particular a utility vehicle, having a base and a structure, wherein the suspension arrangement has at least one air spring and a spring control of the at least one air spring, is characterized in that the spring control has a pressure accumulator with a hydraulic chamber, an air chamber and a diaphragm, which separates the hydraulic chamber and the air chamber, wherein the hydraulic chamber of the pressure accumulator is connected to a pump for a fluid, wherein the air chamber of the pressure accumulator is connected to the air spring.

One advantage lies in the fact that no air compressor is required. This is particularly advantageous in the case of electrically driven utility vehicles with an electromechanical brake system without compressed air.

The pump, e.g. for a hydraulic fluid, can also be a hydraulic pump of the vehicle which is already present. A hydraulic transmission can furthermore be used.

Pressures of up to 50 bar or more can advantageously be provided in a simple manner. One advantage in this case is furthermore a small installation space.

A conventional air spring can furthermore advantageously be used since the air is not blown out into the surroundings since the air spring is connected to a pressure accumulator.

Pressure accumulators or hydraulic accumulators are normally used to maintain the pressure in hydraulic systems. Here, instead, the pressure in the air spring is set and maintained.

A method according to the invention for controlling a suspension arrangement for a vehicle, in particular a utility vehicle, having a base and a structure, wherein the suspension arrangement comprises at least one first spring and at least one second spring, wherein the at least one first spring and the at least one second spring have spring fastenings which are connected to fastening devices on one hand of the structure and on the other hand of the base. The method has the following steps. S1) Operating the suspension arrangement in a first operating position without loading only with the at least one first spring; S2) Operating the suspension arrangement in a second operating position, in the case of which a maximum load is present, with the at least one first spring and with the at least one second spring, in that the at least one second spring is arranged parallel to the first spring by means of an adjustment device and is connected to the structure; and S3) Operating the suspension arrangement in a third operating position, in which a load in a range from 20% to 80%, in particular in a range from 30% to 70%, of the maximum load is present, only with the at least one second spring, wherein the at least one first spring is detached from the structure. One particular advantage in this case is that the control is executed in a load-dependent manner and can thus automatically perform compensation of the load.

A further method according to the invention for controlling a suspension arrangement for a vehicle, in particular a utility vehicle, having a base and a structure, wherein the suspension arrangement has at least one air spring and a spring control of the at least one air spring, has the following method steps. VS1) Providing the suspension arrangement with an air spring with an adjustable rigidity, wherein the suspension arrangement has at least one pressure accumulator connected to the air spring; VS2) Filling a hydraulic chamber of the at least one pressure accumulator with hydraulic fluid and generating a pressure in the hydraulic chamber; VS3) Transferring the pressure of the hydraulic chamber to an air volume of an air chamber which communicates with the air spring; and VS4) Controlling the spring arrangement by adjusting the rigidity of the air spring by varying the pressure or the filling quantity of the hydraulic fluid in the hydraulic chamber of the pressure accumulator.

Advantageous further developments of the invention are indicated by the subordinate claims.

In one embodiment, the fastening devices of the at least one first spring and the at least one second spring have a release mechanism and a locking mechanism in interaction with the associated spring fastenings. This is advantageous because such a latching-in mechanism, in the locked state, produces a fixed connection of the springs to the sprung mass or the structure and, in the unlocked or detached state, enables a separation of the connection between the spring and the sprung mass, for example, when a raised position of the mass or the structure is assumed.

It is advantageous if the at least one adjustment device has an adjustment drive which is an electric motor, a pneumatic or/and a hydraulic cylinder. These parts are compact, low-cost and available with high quality on the market. A small electric motor with a very high transmission ratio is sufficient for the actuation of a lever mechanism.

In a further embodiment, it is provided that the at least one adjustment device has a leveling function, a lever mechanism and/or a locking device. By means of the leveling function, an additional leveling device is advantageously no longer necessary. A lever mechanism, e.g. a scissor-type jack, has a compact structure. It advantageously arises with the locking device that the adjustment device can be blocked in any desired position without additional actuating forces being necessary.

In a yet further embodiment, at least one damper is assigned to the at least one first spring and/or at least one damper is assigned to the at least one second spring. These dampers can also advantageously be assigned compactly to the springs and also equipped with these by means of the fastening apparatuses with a release mechanism and locking mechanism.

In one embodiment, a spring rigidity $c_1$ of the at least one first spring has a smaller value than a spring rigidity $c_2$ of the at least one second spring. A variation of an overall rigidity can advantageously be enabled in this manner.

In the embodiment of the suspension arrangement with the air spring, the connection of the air chamber of the pressure accumulator to the air spring has a connecting line and a switching element, wherein the switching element connects the connecting lines to one another in a switching position and closes them against one another in another switching position.

Yet another embodiment provides that the air chamber of the pressure accumulator is connected via a connecting line and a switching element to the ambient atmosphere, wherein the switching element connects the connecting lines to one another in one switching position and closes them against one another in another switching position. The compressed air can thus escape in a simple switched manner. In this manner, a compressor function can be realized in that several strokes of the pressure accumulator can be enabled. Further advantages include a smaller hydraulic pressure accumulator, compensation of long-term air losses. Larger paths are furthermore possible in the course of adjustment, e.g. in the case of what is known as leveling.

In one embodiment of the method for controlling the spring arrangement with the adjustment device, in a fourth operating position of the suspension arrangement, the structure is adjusted into a raised position by means of the adjustment device and the at least one second spring, wherein the at least one first spring is detached from the structure. A simple and additional function of a height adjustment of the structure is thus produced.

In a further embodiment of the method, it is provided that, in a fifth operating position of the suspension arrangement, the structure is adjusted into a lowered position by means of the adjustment apparatus and the second spring, in which lowered position the at least one first spring is connected to the structure. This is also an advantageous additional function which does not require an additional drive.

In one embodiment of the method for controlling the spring arrangement with the air spring, it is provided that, in method step VS4, the rigidity of the air spring set in this manner is maintained by a switchable connection of a connecting line between the air chamber of the pressure accumulator and the air spring by virtue of the fact that the switchable connection closes or blocks the connecting line.

Moreover, in method step VS1 (provision), the pressure accumulator is provided with a switchable connecting line of its air chamber to the ambient atmosphere. An advantageously controlled blowing out of the compressed air can thus be performed which is advantageous for a compressor function for generating high pressures.

In second method step VS2 (filling), the switchable connection of the connecting line of the air chamber to the ambient atmosphere is closed by means of a switching element and the hydraulic chamber is filled with hydraulic fluid. This process can advantageously be easily controlled with the switching element, e.g. a solenoid valve. The valve can naturally also be actuated pneumatically, hydraulically or by electric motor. These components are available are low cost and with high quality.

If, in third method step VS3 (transfer), an opening of a switchable connecting line to the air spring is performed by means of a switching element and the hydraulic chamber of the pressure accumulator is completely filled with hydraulic fluid so that no air remains any more in the air chamber of the pressure accumulator, the high pressure in the air spring is thus advantageously stored in a simple manner.

In yet another embodiment of the method, in fourth method step VS4 (control), a closing of the switchable connecting line to the air spring is performed by means of the switching element, wherein thereafter the hydraulic fluid is discharged from the hydraulic chamber of the pressure accumulator and the connecting line to the ambient atmosphere is opened again by means of the switching element, and a repetition of this cycle until a previously specified pressure in the air spring is reached. It is advantageous in this case that the pressure fed into the air spring remains therein as a result of the closing of the connecting line and can be increased by the next pressure of the air chamber as a result of a next generation of pressure in the hydraulic chamber of the pressure accumulator. This cycle can advantageously be repeated until a desired pressure and thus a desired rigidity of the air spring are achieved.

Exemplary embodiments of the invention are described below on the basis of the enclosed drawings. These exemplary embodiments serve only to illustrate the invention on the basis of preferred constructions which, however, do not conclusively represent the invention. Provided that they are in the scope of the claims, other exemplary embodiments as well as modifications and equivalents of the represented exemplary embodiments can also be realized.

DETAILED DESCRIPTION OF THE DRAWINGS

Figure 1:
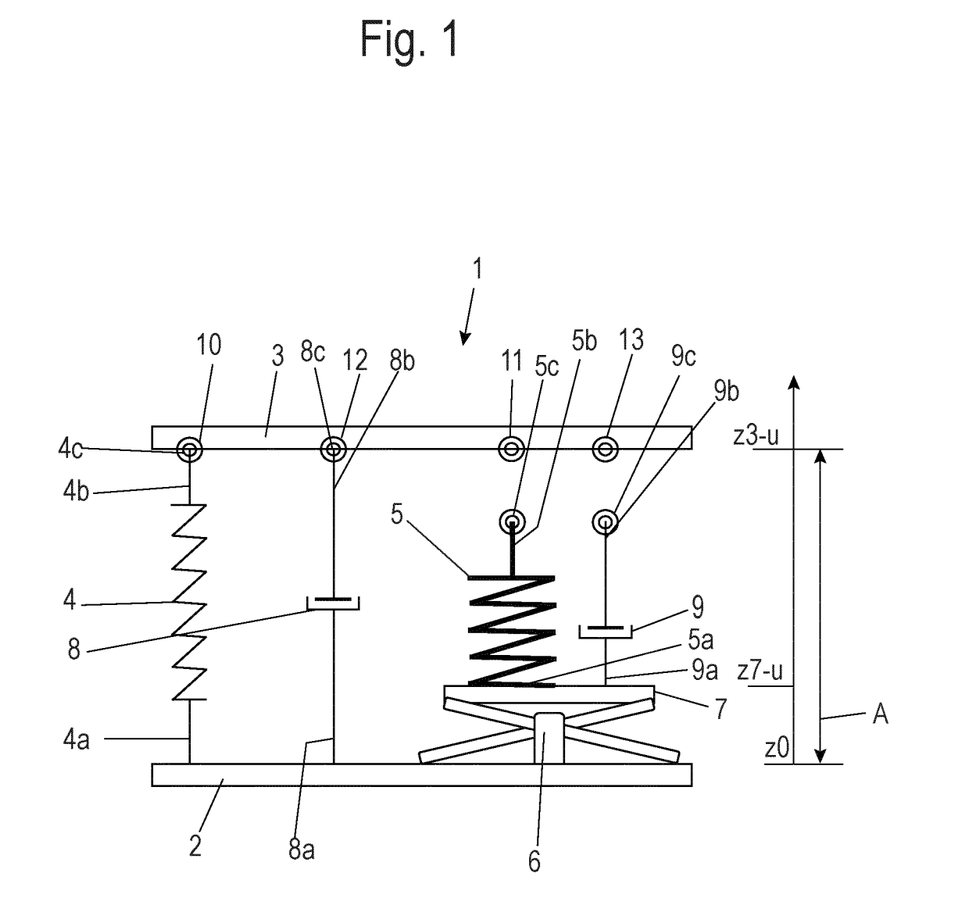
FIG. 1 is a schematic symbolic representation of a first exemplary embodiment of a suspension arrangement according to the invention in a first operating position.

FIG. 1 shows a schematic symbolic representation of a first exemplary embodiment of a suspension arrangement 1 according to the invention.

The suspension arrangement 1 serves to suspend a structure 3 with respect to a base 2. In the present example, the structure 3 is a chassis or a body of a vehicle, not shown, wherein the base 2 is a wheel suspension or an axle of the vehicle.

A coordinate z runs here perpendicular to the base 2, e.g. in a vertical axis of the associated vehicle. The coordinate z serves to illustrate various positions of the structure 3 in relation to the base 2 which is assigned here a position z0 as a reference position.

The structure 3 assumes different positions and thus different distances A to the base 2 depending on a loading of the structure 3. FIG. 1 shows an unloaded state. In this unloaded state, the structure 3 is in a position z3-$u$ assigned to this state. In this case, the suspension arrangement 1 is located in a first operating position.

The structure 3 can furthermore be adjusted into a raised position z3-H and into a lowered position z3-N.

The suspension arrangement 1 comprises at least one first spring 4 with a first spring rigidity c1, at least one second spring 5 with a second spring rigidity c2, fastening devices 10, 11, 12, 13 on the structure 3 and undesignated fastening devices on the base 2, as well as an adjustment device 6.

In the example shown, the suspension arrangement 1 furthermore comprises at least one first damper 8 and at least one second damper 9.

The first spring 4 is fastened with a first spring end 4$a$ to the base 2 in a manner not shown in greater detail. A second spring end 4$b$ of the first spring 4 is attached as a detachable spring fastening 4$c$ to a fastening device 10 of the structure 3.

The detachable spring fastening 4$c$ is not represented in greater detail. It can have e.g. a locking or latching-in mechanism which independently connects the second spring end 4$b$ to the fastening device 10 if the detachable spring fastening 4$c$ is introduced into the fastening device 10. A release of the detachable spring fastening 4$c$ from the fastening device 10 can be performed, for example, by an actuator which is formed pneumatically or/and electromechanically.

In an identical manner, the first damper 8 is attached with a first damper end 8$a$ to the base 2 and with a second damper end 8$b$ to a detachable damper fastening 8$c$ on an associated fastening device 12 of the structure 3. The first damper 8 is connected or attached parallel to the first spring 4.

In the unloaded state shown in FIG. 1, the first spring 4 is neither compressed nor pulled apart.

A first spring end 5$a$ of the second spring 5 and a first damper end 9$a$ of the second damper 9 are, in contrast to the first spring 4 and the first damper 8, not fastening directly to the base 2, but rather to an adjustment plate 7 of the adjustment device 6. The adjustment device 6 is itself attached to the base 2 and is described in greater detail further below.

A second spring end 5$b$ of the second spring 5 and a second damper end 9$b$ of the second damper 9 are provided in each case with a detachable spring fastening 5$c$ and damper fastening 9$c$ described above. The functions of these fastenings 5$c$ and 9$c$ are the same as those of the fastenings 4$c$ and 8$c$ already indicated above.

In the unloaded state shown in FIG. 1, the first spring 4 is neither compressed nor pulled apart. The first spring 4 and the first damper 8 are connected to the structure 3, wherein the second spring 5 and the second damper 9 are detached from the structure 3.

The adjustment plate 7 of the adjustment device 6 is located here in an idle position which is designated by z7-$u$.

The adjustment device 6 has an adjustment drive. The adjustment drive can be, for example, an electric motor, a pneumatic or/and a hydraulic cylinder. In the example shown, the adjustment device 6 is equipped with a scissor mechanism, but is not restricted thereto.

The adjustment device 6 is formed here as a height adjustment device in the direction of the z-axis.

The adjustment device 6 adjusts the adjustment plate 7 in the direction of the z-coordinate together with the second spring 5 fastened thereon and here also with the second damper 9.

In order to compensate for the load of the structure of the assigned vehicle, e.g. utility vehicle, the two or more springs 4, 5 with different rigidity are used in parallel. The springs 4, 5 can be used individually or in combination so that the total rigidity can be varied in a wide range. Assuming that the rigidity c1 of the first spring 4 has the value 1, and the value of the rigidity c2 of the second spring 5 is 3, the total rigidity c can then be varied between 1 and 4.

For a load m of 1:6, this means that the natural frequency ($f_0=\sqrt{(c/m)}$) varies from 1 to 0.8, while it is only in the case of a spring 4 c1 that the natural frequency would drop to 0.4. The range of fluctuation of the natural frequency can thus be greatly reduced.

In order to achieve this, the at least one additional second spring 5 can be applied or brought into contact with the structure 3 via the adjustment apparatus 6, e.g. with a lever mechanism. The adjustment device 6 can also be used as a leveling means and can comprise a small electric motor as an actuator or a hydraulic actuator.

The adjustment device 6 also has a locking apparatus so that it can be blocked in any desired position z7 without additional actuating forces being necessary.

The springs 4, 5 additionally have the spring fastenings 4$c$, 5$c$ as a latching-in mechanism which, in the locked stated, produces a fixed connection of the springs 4, 5 to the sprung mass of the structure 3 and, in the unlocked state, enables a separation of the connection between the spring(s) 4/5 and the sprung mass of the structure 3.

In the unloaded state, the structure 3 is damped with respect to a base 2 via the first spring 4 with the first rigidity c1. This first rigidity c1 is lower than the second rigidity c2 of the second spring 5.

The detachable spring fastenings 4$c$, 5$c$ and the detachable damper fastenings 8$c$, 9$c$ interact in each case with the associated fastening devices 10, 11, 12, 13. In this case, the detachable spring fastenings 4$c$, 5$c$ and the detachable damper fastenings 8$c$, 9$c$ can have in each case independent mechanisms for detachable connection.

Figure 2:
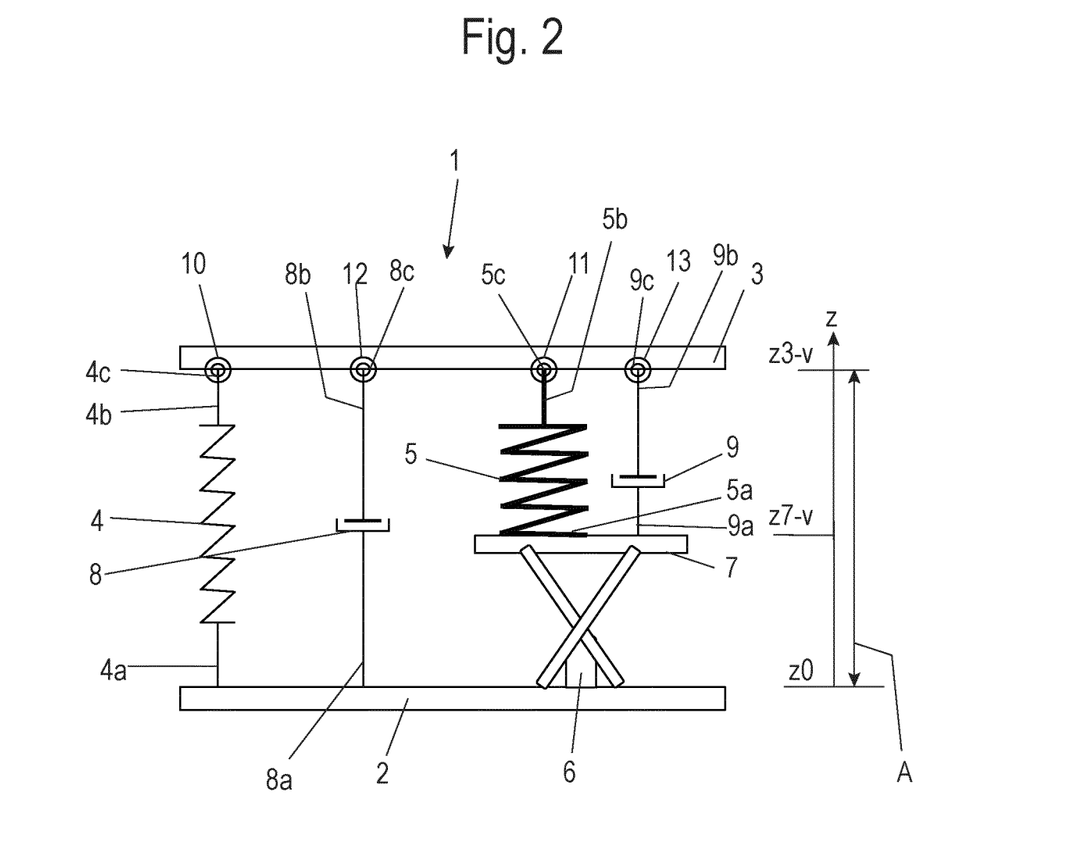
FIG. 2-5 are schematic symbolic representations of the first exemplary embodiment according to FIG. 1 in further, different operating positions.

FIGS. 2-5 show schematic symbolic representations of the first exemplary embodiment according to FIG. 1 in further different operating positions. FIG. 2 thus shows a fully loaded state in a second operating position of the suspension arrangement 1.

Figure 3:
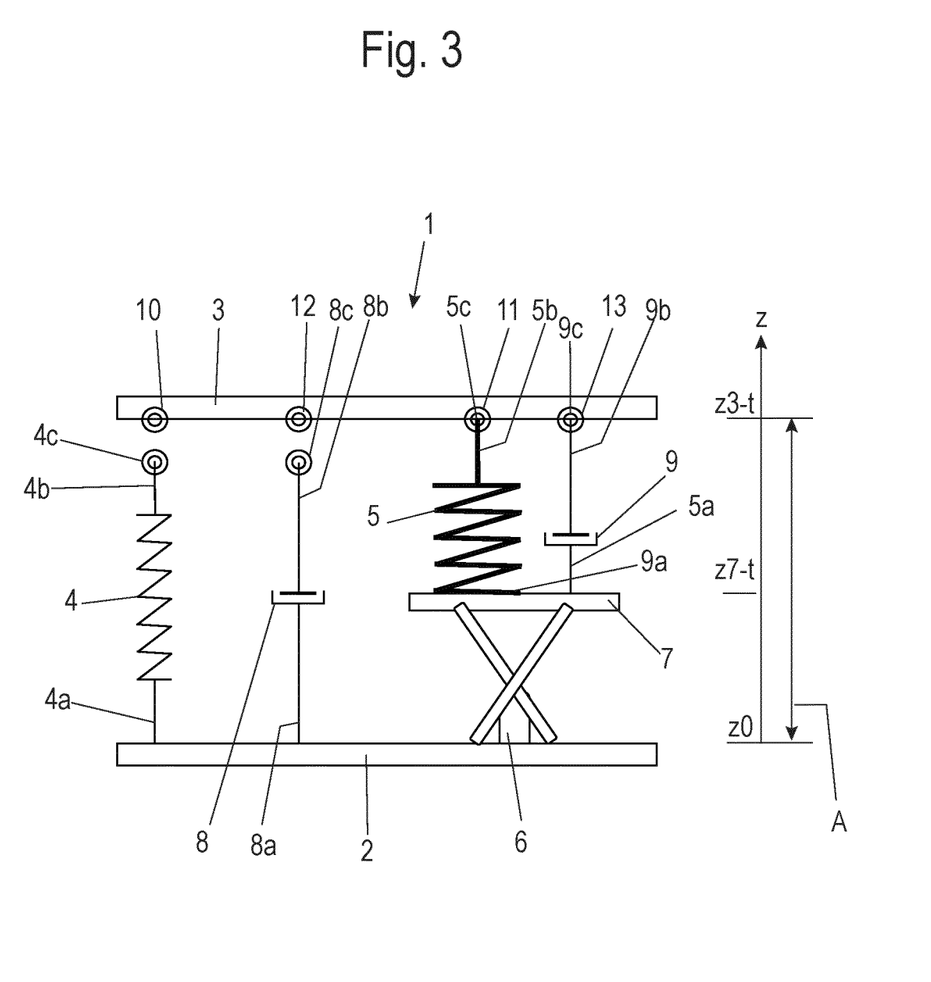

FIG. 3 shows a partially loaded state of approx. 30% to 70% of the total load with a third operating position of the suspension arrangement 1.

Figure 4:
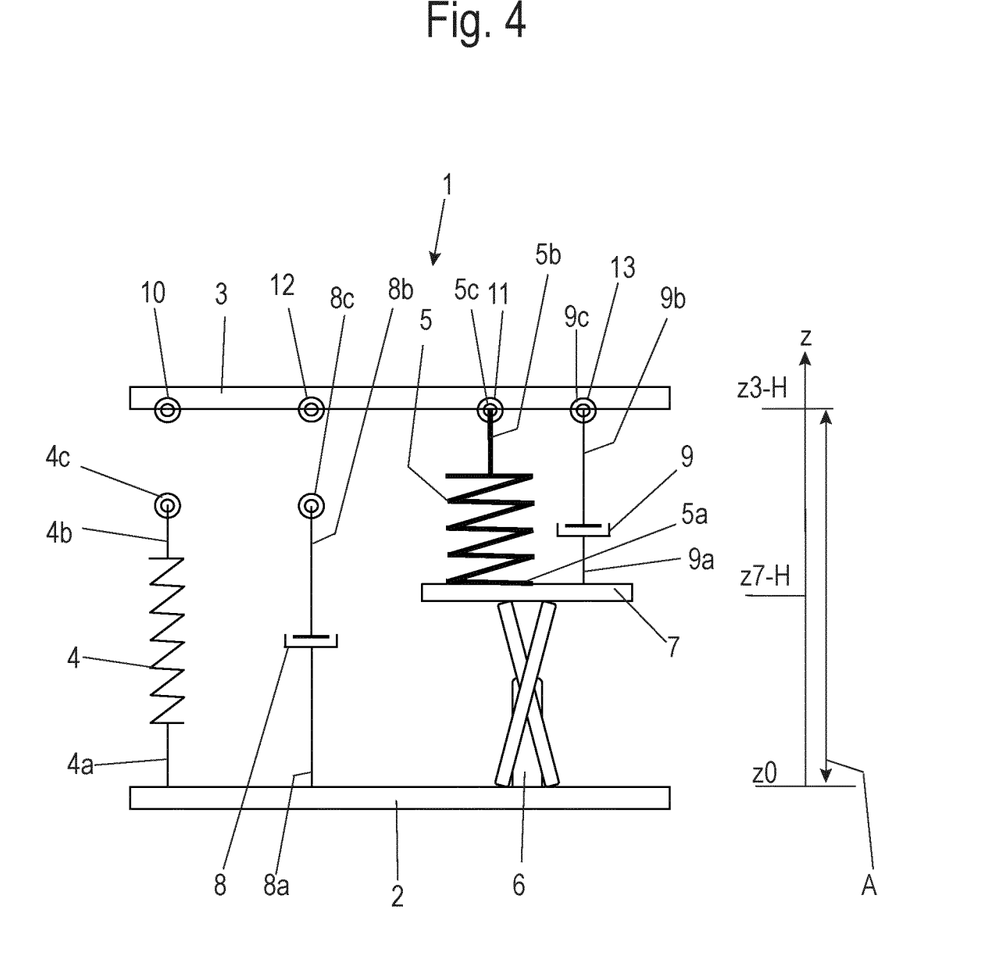
Figure 5:
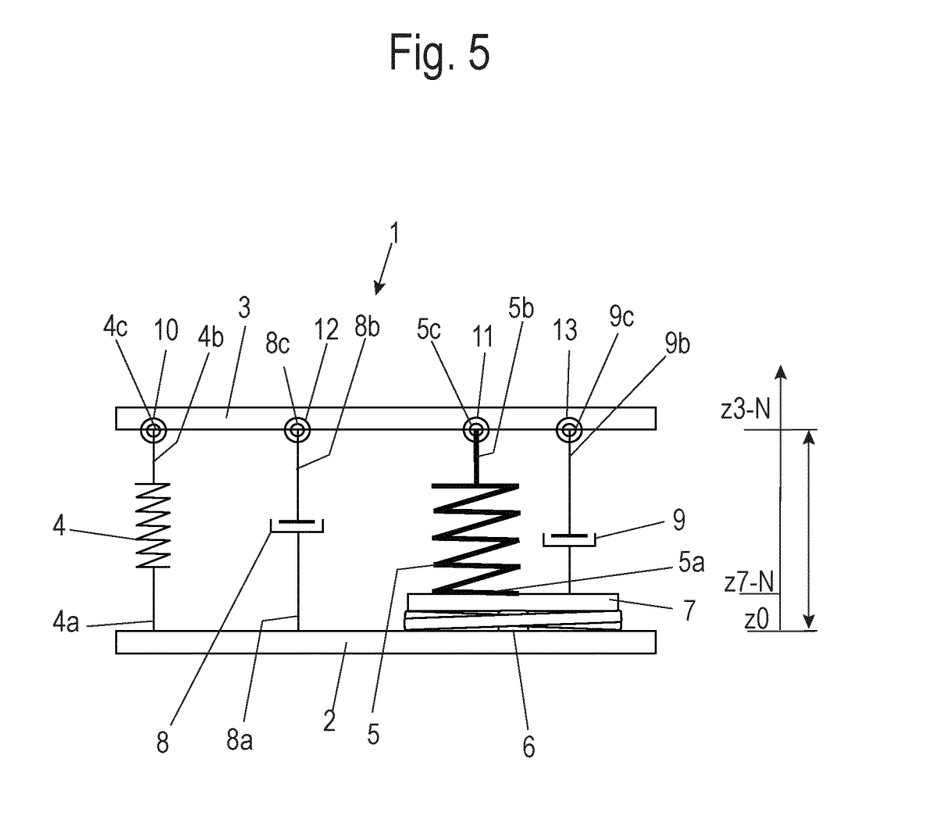

FIG. 4 shows a raised state of the structure 3 with a fourth operating position of the suspension arrangement 1, and FIG. 5 represents a lowered state of the structure 3 in a fifth operating position of the suspension arrangement 1.

In the fully loaded state, as shown in FIG. 2, the adjustment device 6 has adjusted the adjustment plate 7 into a higher position z7-$v$ in order in this manner to connect the second spring 5 and the second damper 9 to the structure 3 via the fastening devices 11, 13.

In this fully loaded state, the structure assumes a position $z3$-$v$ with the distance A to the base 2. The first spring 4 and the second spring 5 are now connected in parallel, as a result of which a total rigidity is the sum of the rigidity $c1$ of the first spring 4 and the rigidity $c2$ of the second spring 5.

The dampers 8 and 9 are also arranged under one another in this state and parallel to the springs 4, 5.

FIG. 3 shows an exemplary partially loaded state of approx. 30% to 70% of the total load or maximum load of the structure 3. The structure 3 is located in a position $z3$-$t$ which is higher than the position $z3$-$v$ in the fully loaded state (FIG. 2). The adjustment plate 7 is adjusted to an appropriate position $z7$-$t$ which corresponds either still to the position $z7$- in the fully loaded state or can be higher.

In this case, the first spring 4 and the first damper 8 are detached from the structure 3 in that the spring fastening 4*c* and the damper fastening 8*c* are detached from the respective fastening device 10, 12.

The second spring 5 and the second damper 9 are, in the partially loaded state, connected to the structure 3. The structure 3 is thus damped via the second, harder rigidity $c2$ of the second spring 5 with respect to the base 3.

The raised state in FIG. 4 is set by the adjustment apparatus 6 and the second spring 5 fastened on it. The adjustment plate 7 is located in a position $z7$-H, wherein the structure 3 is in a position $z3$-H.

The second damper 9 is arranged parallel to the second spring 5. The second spring 5 and the second damper 9 are connected with their fastenings 5*c*, 9*c* to the associated fastening devices 11, 13 of the structure 3.

The first spring 4 and the first damper 8 are detached from the structure 3.

The adjustment device 6 serves in this case simultaneously as height adjustment of the structure 3.

FIG. 5 shows a lowered state of the structure 3, in which the adjustment device 6 has lowered the adjustment plate 7 to a minimum extent in position $z7$-N. Here, a minimum distance A between the reference position $z0$ and the position $z3$-N of the structure 3 is assumed.

The first spring 4, the second spring 5, the first damper 8 and the second damper 9 are, in this lowered state, all connected with their fastenings 4*c*, 5*c*, 8*c*, 9*c* to the structure 3 via the respective associated fastening devices 10, 11, 12, 13.

The springs 4, 5 can be designed as desired, e.g. as helical springs, air springs, and the like.

The springs 4, 5 can integrate a damping function, e.g. by overflowing in the
case of an air spring.

The dampers 8, 9 can, as shown, be connected parallel to the respective spring 4, 5.

The at least one second damper 9 can be used jointly with the second spring 5 by the adjustment device 7. It is, however, also possible that the second damper 9 can have its own separate adjustment device 6.

The adjustment drive of the adjustment device 6 can, in a design as an electric motor, be formed as a relatively small geared motor with a very high transmission ratio. A type of rod drive is also conceivable in the case of the scissor-type lever mechanism shown.

In order to control the suspension arrangement 1, i.e. the adjustment device 6 and the fastening apparatuses 10, 11, 12, 13, the suspension arrangement 1 has a control device, not shown, which is connected e.g. to at least one load sensor. This control device furthermore has actuators with which the raised state and the lowered state of the structure 3 can be set.

Figure 6:
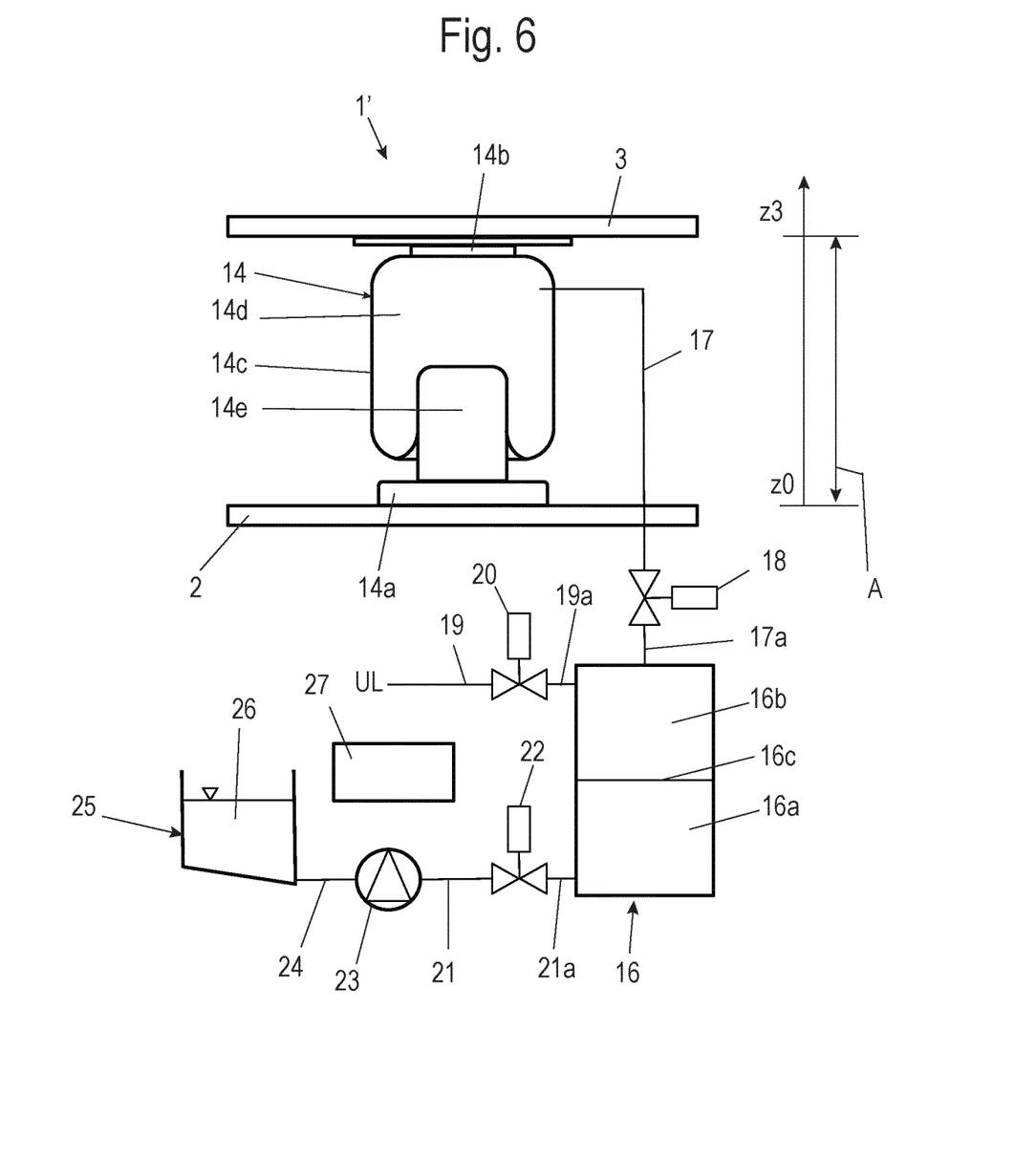
FIG. 6 is a schematic block representation of a second exemplary embodiment of the suspension arrangement according to the invention.

FIG. 6 represents a schematic block representation of a second exemplary embodiment of the suspension arrangement 1 according to the invention.

In the second exemplary embodiment, the suspension arrangement 1' comprises at least one air spring 14 and an air spring control 15 with which a rigidity of the air spring 14 can be controlled. Moreover, the distance A from base 2 and structure 3 can be changed by means of the air spring 14, as described above. In this manner, the operating positions described above of the suspension arrangement 1' can be occupied.

The structure 3 is damped with respect to the base 2 here by means of the air spring 14. The air spring 14 is connected to the structure 3 with an air spring fastening 14*a* on the base 2 and with another air spring fastening 14*b*. The function of an air spring 14 is taken as known.

The air spring 14 is shown schematically merely by way of example. It has a spring bellows 14*c* with an inner space 14*d* and a displacement piston 14*e*. Other types of structure of the air spring 14 are of course possible.

The air spring control 15 comprises a pressure accumulator 16, a pump 23, a storage container 25 and a control unit 27.

The air spring control 15 furthermore has switching elements 18, 20, 22 by means of which various connecting lines 17, 17*a*; 19, 19*a*; 21, 21*a* can be switched. In one position, the switching element 18 connects the connecting lines 17 and 17*a* to one another and, in another position, closes these with respect to one another. Thus, in one position, the switching element 20 connects the connecting lines 19 and 19*a* to one another and, in another position, closes these with respect to one another. And, in one position, the switching element 22 connects the connecting lines 21 and 21*a* to one another and, in another position, closes these with respect to one another.

In other words, the switching elements 18, 20, 22 open a passage of the connecting lines 17, 17*a*; 19, 19*a*; 21, 21*a* or close these. For this purpose, the switching elements 18, 20, 22 are formed here, for example, as switching valves. They can be actuated electrically, electromagnetically, hydraulically, pneumatically. Here, each of the switching elements 18, 20, 22 has at least one closed position and an open position. It is also possible that the switching elements 18, 20, 22 are adjustable from the open position into the closed position and back continuously or gradually.

The pressure accumulator 16 has a hydraulic chamber 16*a* and a fluid chamber which is here an air chamber 16*b*. The hydraulic chamber 16*a* and the air chamber 16*b* are separated by a diaphragm 16*c*.

The inner space 14*d* of the air spring 14 is connected via the connecting line 17 to the switching element 18 which produces or blocks a connection of the connecting line 17 to a further connecting line 17*a* which communicates with the air chamber 16*b* of the pressure accumulator 16.

Moreover, the air chamber 16*b* can be connected to the connecting line 19*a* via the switching element 20 and the connecting line 19 can be connected to the ambient atmosphere UL.

The hydraulic chamber 16*a* of the pressure accumulator 16 is connected to the connecting line 21*a* which is connected to the switching element 22. The switching element 22 itself is connected to the pump 23 via the connecting line 21. Finally, the pump 23 is connected by means of a connecting line 24 to the storage container 25. The storage container 25 forms a storage space for a fluid 26.

The control unit 27 is connected to the switching elements 18, 19, 22 and the pump 23. Further sensors, e.g. for the fill level of the fluid 26 in the storage container 25, for the pressure in the chambers 16a, 16b and in the inner space 14d of the air spring 14, for temperatures at various locations are connected to the control unit 2, but are not shown, however are easily conceivable.

The control unit 27 itself is in communication with a superordinate chassis control of the associated vehicle.

In the second exemplary embodiment, the air spring 14 does indeed form a conventional air suspension of the structure 3 with respect to the base, but the air of the air spring 14 here is not blown out into the ambient atmosphere UL, but rather is connected to the pressure accumulator 16, wherein this connection is switchable. Pressure accumulators 16 or hydraulic accumulators are normally used to maintain the pressure in hydraulic systems. Here, instead, the pressure in the air spring 14 is set by the air spring control 15.

A high pressure of the compressed air (can also be nitrogen) located in the air chamber 16b of the pressure accumulator 16 can be realized via the pressure accumulator 16. For this purpose, a fill level or fill quantity of a hydraulic fluid in the hydraulic chamber 16a of the pressure accumulator 16 varies. This is performed by means of the pump 23 which is a hydraulic pump. It is also possible to use a hydraulic transmission.

The hydraulic fluid in the hydraulic chamber 16a is in pressure connection with the air in the air chamber 16b via the diaphragm 16c. The pressure in the air chamber 16b and thus in the inner space 14d of the air spring 14 can thus be set in that the pressure of the fill quantity or the fill quantity in the hydraulic chamber 16a is varied. This occurs via the pump 23, e.g. a hydraulic pump, possibly using a hydraulic transmission. The pump 23 can possibly also be used here as a hydraulic pump for steering the associated vehicle.

The switchable connection of the connecting lines 17, 17a by the switching element 18 can then realize the rigidity of the air spring 14.

In a first variant, the air chamber 16b of the pressure accumulator 16 has no connection to the ambient atmosphere UL. The system is then filled so that the pressure in the air spring 14 and in the pressure accumulator 16 is set in the case of a completely empty pressure accumulator 16 that the minimum desired pressure in the inner space 14d of the air spring 14 is reached. If the pressure accumulator 16, i.e. the hydraulic chamber 16a of the pressure accumulator 16, is now filled, the pressure in the air chamber 16b of the pressure accumulator 16 and via the open switching element 18 in the connecting line 17, 17a and in the inner space 14d of the air spring 14 increases. In the case of a hydraulic chamber 16a, which is completely filled with fluid 26, of the pressure accumulator 16, the pressure in the inner space 14d of the air spring 14 corresponds to the maximum possible pressure. In this case, the maximum pressure which can be achieved in the inner space 14d of the air spring 14 is dependent on the ratio of the volumes in the inner space 14d of the air spring 14 and in the chambers 16a, 16b in the pressure accumulator 16. After reaching the desired pressure in the inner space 14d of the air spring 14, the connecting line 17, 17a to the air chamber 16b of the pressure accumulator 16 is closed by means of the switching element 18. In this manner, the pump 23 does not have to continuously maintain the pressure in the chambers 16a, 16b of the pressure accumulator 16 (key difference in comparison with hydropneumatics).

In a second variant, the pressure accumulator 16 also has a switchable connection of its air chamber 16b to the ambient atmosphere UL. The connecting lines 19, 19a and the switching element 20 serve this purpose. The pressure accumulator 16 can thus be operated by the air spring control 15 quasi like a compressor.

A cycle of such compressor operation looks e.g. like below.

1. Hydraulic chamber 16a of the pressure accumulator 16 initially without fluid, wherein the switchable connecting line 19, 19a, which is connected to the air chamber 16b of the pressure accumulator 16, is opened to the ambient atmosphere UL by means of the switching element 20.

2. Closing the connecting line 19, 19a by means of the switching element 20 to the ambient atmosphere UL.

3. Filling the hydraulic accumulator 16a of the pressure accumulator 16 with fluid, very high pressures can be generated in the gas side, i.e. in the air chamber 16b and thus via the connecting line 17, 17a in the air chamber 14 (e.g. 60 bar).

4. Opening the switchable connecting line 17, 17a to the air spring 14 by means of the switching element 18. The compressed air escapes into the inner space 14d of the air spring 14.

5. Complete filling of the hydraulic chamber 16a of the pressure accumulator 16 with hydraulic fluid so that no air remains any more in the air chamber 16b of the pressure accumulator 16.

6. Closing the switchable connecting line 17, 17a to the air spring 14 by means of the switching element 18.

7. Discharging the fluid from the hydraulic accumulator, e.g. by opening the switching element 22. A pumping out by means of the pump 23 or by means of a further pump is also possible 8. Opening the connecting line 19, 19a to the ambient atmosphere UL by means of the switching element 20.

By repeating this cycle, it is possible to achieve any desired pressures in the air spring 14. The air can possibly be discharged again with respect to the ambient atmosphere UL. The system can thus also be used for leveling, in an analogous manner to the pressure springs previously used. Leakage of air can be balanced out. A key advantage of the system is that a conventional compressor does not have to be used. Existing hydraulic pumps, e.g. power steering, of the associated vehicle can possibly be used.

The air spring 14 can have an integrated damping. Additional dampers are also possible.

Figure 7:
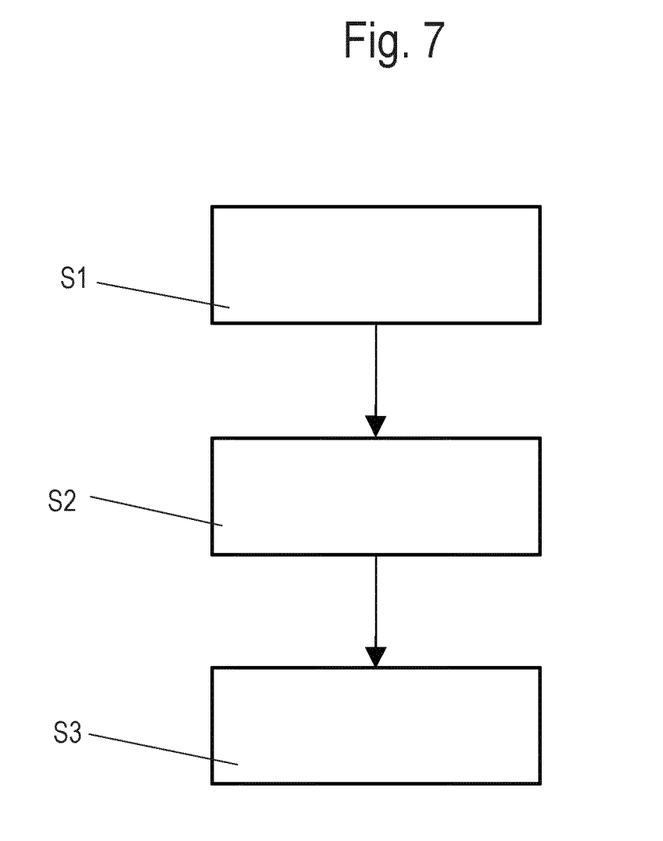
FIGS. 7-8 are schematic flow charts of methods according to the invention.

FIG. 7 shows a schematic flow chart of a method according to the invention for controlling a suspension arrangement 1 according to FIGS. 1 to 5.

The suspension arrangement 1 is provided with at least one first spring 4 with a rigidity $c1$ and with at least one second spring 5 with a rigidity $c2$. The rigidity $c2$ of the second spring 5 is greater than the rigidity $c1$ of the first spring 4.

In a first method step S1, the suspension arrangement 1 is only operated with the first spring 4 in a first operating position, wherein no loading is present in the first operating position.

In a second method step S2, the suspension arrangement 1 is operated with the first spring 4 and with the second spring 5 in a second operating position in which a maximum load is present by virtue of the fact that the second spring 5 is, by means of an adjustment device 6, arranged parallel to the first spring 4 and connected to the structure 3.

In a third operating position in which a load in a range from 20% to 80%, in particular in a range from 30% to 70%, of the maximum load is present, the suspension arrangement 1 is only operated with the second spring 5 in a third method step S3. The first spring 4 is detached from the structure.

In a fourth operating position of the suspension arrangement 1, the structure 3 is adjusted by means of the adjustment device 6 and the second spring 5 into a raised state. The first spring 4 is detached from the structure 3.

In a fifth operating position of the suspension arrangement 1, the structure 3 is adjusted by means of the adjustment device 6 and the second spring 5 in a lowered position in which the first spring 4 is connected to the structure 3.

Figure 8:
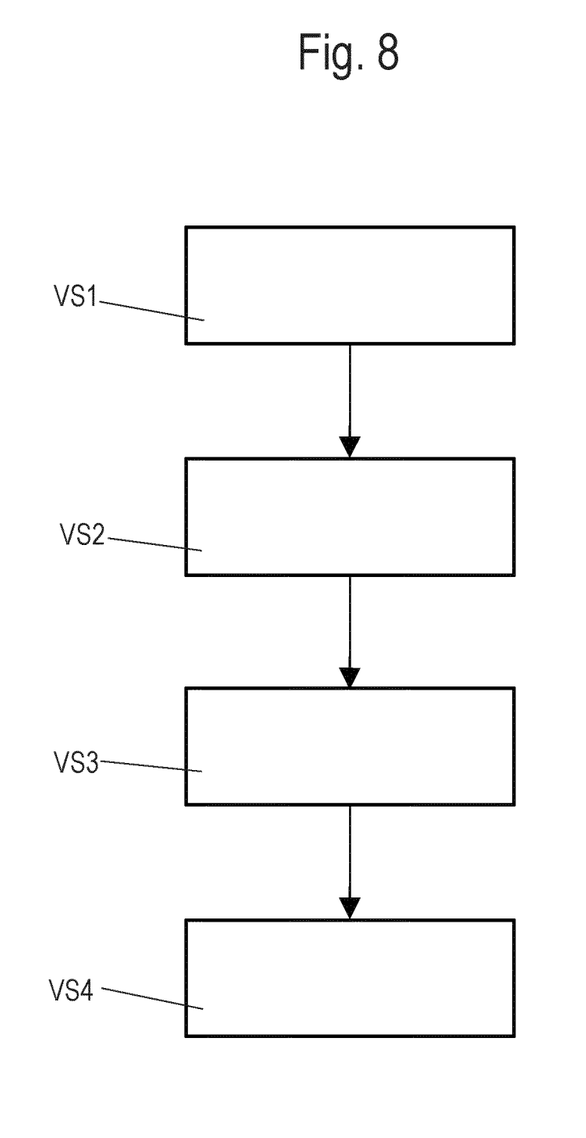

FIG. 8 represents a schematic flow chart of a method according to the invention for controlling a suspension arrangement 1' according to FIG. 6.

The rigidity of the air spring 14 is adjusted by means of the spring control 15 via a pressure accumulator 16 with at least one pump 23.

In a first method step VS1, a suspension arrangement 1' is provided with an air spring 14 with an adjustable rigidity, wherein the suspension arrangement 1' has at least one first air spring 14 which is connected to at least one pressure accumulator 16.

In a second method step VS2, hydraulic fluid is pumped into a hydraulic chamber 16a of at least one pressure accumulator 16 by means of a pump 23 and generates a pressure in the hydraulic chamber 16a.

The pressure in the hydraulic chamber 16a is transferred via a diaphragm 16c to an air volume in an air chamber 16b which communicates with the air spring 14. This is performed in a third method step VS3.

In a fourth method step VS4, the suspension arrangement 1' is thus controlled in that the rigidity of the air spring 14 is set by varying the pressure or the fill quantity of the hydraulic fluid in the hydraulic chamber 16a of the pressure accumulator 16. The rigidity of the air spring 14 set in this manner is then maintained by a switchable connection of a connecting line 17, 17a between air chamber 16b of the pressure accumulator 16 and the air spring 14 by virtue of the fact that the switchable connection closes or blocks the connecting line 17, 17a.

In the second variant in which the pressure accumulator 16 is operated quasi like a compressor by the air spring control 15, in first method step VS1 the pressure accumulator 16 is provided with a shiftable connection of its air chamber 16b to the ambient atmosphere UL.

In second method step VS2, the switchable connection of the connecting line 19, 19a of the air chamber 16b to the ambient atmosphere UL is thus closed by means of the switching element 20 and the hydraulic chamber 16a is filled with hydraulic fluid.

In third method step VS, an opening of the switchable connecting line 17, 17a to the air spring 14 is performed by means of the switching element 18. The compressed air escapes into the inner space 14d of the air spring 14. The hydraulic chamber 16a of the pressure accumulator 16 is then completely filled with hydraulic fluid so that no air remains any more in the air chamber 16b of the pressure accumulator 16.

In fourth method step VS, a closing of the switchable connecting line 17, 17a to the air spring 14 is performed by means of the switching element 18. Thereafter, the hydraulic fluid is discharged from the hydraulic chamber 16a of the pressure accumulator 16. And the connecting line 19, 19a to the ambient atmosphere UL is opened by means of the switching element 20.

Repeating the method steps of the second variant makes it possible to achieve any desired, previously specified pressures in the air spring 14.

The invention is not restricted by the exemplary embodiments described above, but rather can be modified in the scope of the claims.

It is conceivable that the adjustment device 6 can also be fastened to the structure 3.

The detachable connections of the at least one second spring 5 and of the at least one second damper 9 can be attached to the base 2, in particular in this case.

It is also conceivable that the detachable connections of the at least one first spring 4 and of the at least one first damper 8 can be attached to the base 2.

It is furthermore conceivable that the at least one first spring 4 is also connected to a further adjustment device 6 (not shown).

LIST OF REFERENCE NUMBERS

1, 1' Suspension arrangement
2 Base
3 Structure
4, 5 Spring
4a, 4b; 5a, 5b Spring end
4c, 5c Spring fastening
6 Adjustment device
7 Adjustment plate
8, 9 Damper
8a, 8b; 9a, 9b Damper end
8c, 9c Damper fastening
10, 11, 12, 13 Fastening device
14 Air spring
14a, 14b Air spring fastening
14c Spring bellows
14d Inner space
14e Displacement piston
15 Air spring control
16 Pressure accumulator
16a Hydraulic chamber
16b Air chamber
16c Diaphragm
17, 17a; 19, 19a; 21, 21a Connecting line
18, 20, 22 Switching element
23 Pump
24 Connecting line
25 Storage container
26 Fluid
27 Control unit
A Distance
S1-3; VS1-4 Method step
UL Ambient atmosphere
z Coordinate
z3- . . . . Structure position
z7- . . . . Adjustment position

The invention claimed is:

1. A suspension arrangement for a vehicle, comprising:
a base and a structure;
at least one first spring and at least one second spring, wherein
the at least one first spring and the at least one second spring have spring fastenings which are connected on one hand to fastening devices of the structure and on the other hand to the base; and
at least one adjustment device, wherein the at least one second spring is attached to the base via the adjustment device, wherein
a spring rigidity c1 of the at least one first spring has a smaller value than a spring rigidity c2 of the at least one second spring.

2. The suspension arrangement according to claim 1, wherein
the fastening devices of the at least one first spring and the at least one second spring have a release mechanism and a locking mechanism in interaction with the associated spring fastenings.

3. The suspension arrangement according to claim 1, wherein
the at least one adjustment device has an adjustment drive which is an electric motor, a pneumatic and/or a hydraulic cylinder.

4. The suspension arrangement according to claim 3, wherein
the at least one adjustment device has a leveling function, a lever mechanism and/or a locking apparatus.

5. The suspension arrangement according to claim 1, further comprising:
a damper assigned to the at least one first spring, and/or
at least one damper assigned to the at least one second spring.

6. The suspension arrangement according to claim 1, wherein the vehicle is a utility vehicle.

7. A suspension arrangement for a vehicle, comprising:
a base and a structure;
at least one air spring and a spring control of the at least one air spring, wherein
the spring control has a pressure accumulator with a hydraulic chamber, an air chamber and a diaphragm, the diaphragm separating the hydraulic chamber and the air chamber, and
the hydraulic chamber of the pressure accumulator is connected to a pump for a fluid, wherein the air chamber of the pressure accumulator is connected to the air spring, wherein
a switching element is interposed between and directly connected to the air chamber of the pressure accumulator and the air spring, and
the switching element connects connecting lines to one another in one switching position and closes them against one another in another switching position.

8. The suspension arrangement according to claim 7, wherein
the air chamber of the pressure accumulator is connected via the connecting lines and an interposed switching element to ambient atmosphere, and
the switching element connects the connecting lines to one another in one switching position and closes them against one another in another switching position.

9. A method for controlling a suspension arrangement for a utility vehicle having a base and a structure, wherein the suspension arrangement comprises at least one first spring and at least one second spring, wherein the at least one first spring and the at least one second spring have spring fastenings which are connected on one hand to fastening devices of the structure and on the other hand to the base,
the method comprising the steps of:
S1) operating the suspension arrangement in a first operating position without loading only with the at least one first spring;
S2) operating the suspension arrangement in a second operating position, in the case of which a maximum load is present, with the at least one first spring and with the at least one second spring, in that the at least one second spring is arranged parallel to the first spring by way of an adjustment device and is connected to the structure;

S3) operating the suspension arrangement in a third operating position, in which a load in a range from 20% to 80%, of the maximum load is present, only with the at least one second spring, wherein the at least one first spring is detached from the structure; and
S4) operating the suspension arrangement in a fourth operating position, in which the structure is adjusted into a raised position by way of the adjustment device and the at least one second spring, wherein the at least one first spring is detached from the structure.

10. The method according to claim 9, further comprising:
S5) operating the suspension arrangement in a fifth operating position, in which the structure is adjusted into a lowered position by way of the adjustment device and the second spring, in which lowered position the at least one first spring is connected to the structure.

11. A method for controlling a suspension arrangement for a utility vehicle having a base and a structure, wherein the suspension arrangement has at least one air spring and a spring control of the at least one air spring, the method comprising the steps of:
VS1) providing the suspension arrangement with an air spring having an adjustable rigidity, wherein the suspension arrangement has at least one pressure accumulator connected to the air spring;
VS2) filling a hydraulic chamber of the at least one pressure accumulator with hydraulic fluid and generating a pressure in the hydraulic chamber;
VS3) transferring the pressure of the hydraulic chamber to an air volume of an air chamber which communicates with the air spring; and
VS4) controlling the suspension arrangement by adjusting a rigidity of the air spring by varying the pressure or a filling quantity of the hydraulic fluid in the hydraulic chamber of the pressure accumulator, wherein
in method step VS4, the rigidity of the air spring is maintained by a switching element that is interposed between and directly connected to the air chamber of the pressure accumulator and the air spring, and
the switching element connects connecting lines to one another in one switching position and closes them against one another in another switching position.

12. The method according to claim 11, wherein
in method step VS1, the pressure accumulator is provided with a switchable connecting line of its air chamber to the ambient atmosphere.

13. The method according to claim 12, wherein
in second method step VS2, a switchable connection of the connecting line of the air chamber to the ambient atmosphere is closed by a first switching element and the hydraulic chamber is filled with hydraulic fluid.

14. The method according to claim 13, wherein
in third method step VS3, an opening of a switchable connecting line to the air spring is performed by a second switching element and the hydraulic chamber of the pressure accumulator is completely filled with hydraulic fluid so that no air remains any more in the air chamber of the pressure accumulator.

15. The method according to claim 14, wherein
in fourth method step VS4, a closing of the switchable connecting line to the air spring is performed by the first switching element, wherein thereafter the hydraulic fluid is discharged from the hydraulic chamber of the pressure accumulator and the connecting line to the ambient atmosphere is opened again by the second switching element, and steps VS2-VS4 are repeated until a previously specified pressure in the air spring is reached.

\* \* \* \* \*